(12) United States Patent
Fukushima et al.

(10) Patent No.: US 7,443,851 B2
(45) Date of Patent: Oct. 28, 2008

(54) DEVICE AND SYSTEM FOR MULTICAST COMMUNICATION

(75) Inventors: Hidehiro Fukushima, Fujisawa (JP); Shigeki Morimoto, Atsugi (JP)

(73) Assignee: Hitachi, Ltd., Tokyo (JP)

( * ) Notice: Subject to any disclaimer, the term of this patent is extended or adjusted under 35 U.S.C. 154(b) by 950 days.

(21) Appl. No.: 10/364,450

(22) Filed: Feb. 10, 2003

(65) Prior Publication Data
US 2003/0218980 A1 Nov. 27, 2003

(30) Foreign Application Priority Data
Apr. 17, 2002 (JP) ............... 2002-114117

(51) Int. Cl.
*H04L 12/16* (2006.01)

(52) U.S. Cl. .................. 370/390; 370/401

(58) Field of Classification Search ......... 370/260–262, 370/252, 352, 390, 392, 401, 466, 389, 65; 709/204; 340/3.52; 455/416
See application file for complete search history.

(56) References Cited

U.S. PATENT DOCUMENTS 5,748,736 A * 5/1998 Mittra ............... 713/163
6,163,810 A * 12/2000 Bhagavath et al. ......... 709/238
6,259,701 B1 7/2001 Shur et al. ................ 370/401
7,079,495 B1 * 7/2006 Pearce et al. .............. 370/260
2004/0037279 A1 * 2/2004 Zelig et al. ................ 370/390
2006/0039388 A1 * 2/2006 Shur et al. ................ 370/401

FOREIGN PATENT DOCUMENTS

JP 10-242962 9/1998

* cited by examiner

*Primary Examiner*—Wing F. Chan
*Assistant Examiner*—Saba Tsegaye
(74) *Attorney, Agent, or Firm*—Townsend and Townsend and Crew LLP

(57) ABSTRACT

A multicast communication device receives data packets multicast for receiving terminals which terminals do not support multicast communication and that are requesting multicast data packets. The multicast communication device then forwards the data packets to the receiving terminals. Communication from the receiving terminal accessing the sending terminal sending data packets to obtain information is monitored. Based on the access contents, a join group request is issued for the group address used by the multicast delivery. The multicast communication device stores service information such as the address of the sending terminal and the destination address of data packets sent by the sending terminal. If the service to be accessed by the receiving terminal is present, multicast delivery of data packets is requested. The multicast communication device forwards received multicast data packets to the receiving terminal.

12 Claims, 10 Drawing Sheets

FIG.3

Service information management table 18

| ID | Address | Protocol | Port | URL | Group | Additional information | Status |
|----|---------|----------|------|------|---------|------------------------|--------|
| 1  | S1      | TCP      | 80   | —    | G1      | —                      | 0      |
| 2  | S2      | TCP      | 80   | url1 | G21,G22 | —                      | 0      |
| 3  | S3      | TCP      | —    | url2 | G3      | —                      | 0      |
|    |         |          |      |      |         |                        |        |

FIG.4

Access terminal management table 19

| Terminal address | Service | Access time |
|------------------|---------|-------------|
| H1               | ID=1    |             |
| H2               | ID=2    |             |
|                  |         |             |

FIG.5

Group management table 15

| Group | Sending terminal |
|-------|------------------|
| G1    | S1               |
| G21   | S2               |
| G22   | S3               |

DEVICE AND SYSTEM FOR MULTICAST COMMUNICATION

BACKGROUND OF THE INVENTION

The present invention relates to a communication method and system for providing a multicasting delivery service as well as to a device for forwarding multicast data packets.

In multicast communication, data packets are broadcast to multiple terminals at the same time. The sending terminal sends data packets addressed to a multicast group, rather than to individual receiving terminals. The receiving terminals can receive data packets by becoming a group member of a desired multicast group. The reception of data packets can be stopped by leaving the group. When information is being sent to multiple terminals, increasing the number of receiving terminals will increase the amount of traffic going through the network. With multicast communications, the amount of traffic stays the same regardless of the number of receiving terminals because router devices copy the packets. Thus, the use of multicasting allows information to be sent to a greater number of receiving terminals without increasing the amount of traffic.

A receiving terminal uses a group management protocol and sends control packets to a router connected to the network. The control packet contains a join group request to become a group member or a leave group request to leave a group. A receiving terminal can request to join or leave a multicast group at any time. Examples of group management protocols include IGMP (Internet Group Management Protocol), defined in RFC (Request for Comments) 2236 from the IETF (Internet Engineering Task Force), and MLD (Multicast Listener Discovery), defined in RFC2710.

The router uses the group management protocol to periodically send a group participation query packet to determine if any group members exist. Receiving terminals that are group members respond to the query with a join group request packet. The router determines whether or not group members exist based on responses to the query packet. Data packets are forwarded to networks containing group members. The router checks for group members, and if it is determined that forwarding of data packets is necessary, it uses a multicast routing protocol to send delivery requests to other routers. If there are no longer any group members, or if it is determined that data packets do not need to be forwarded, a stop delivery request is sent.

The router updates its multicast forwarding information according to the contents of the received multicast routing protocol data. Representative examples of multicast routing protocols include PIM-SM (Protocol Independent Multicast Sparse Mode), defined in RFC2362, and MOSPF (Multicast Open Shortest Path First), defined in RFC1584. Other examples are PIM-DM (Protocol Independent Multicast Dense Mode) and DVMRP (Distance Vector Multicast Routing Protocol), which are draft standards. In these protocols, providing a multicast delivery service requires the multicast routing protocol to be operating on all the routers on the network. In addition, IGMP, MLD, or the like, must be operating on the terminals receiving multicast data packets.

Tunneling technology is used if there are no routers on the network that can handle multicasting. In this case, a virtual transfer path known as a tunnel is set up between multicast routers. When a multicast router acting as the originating end of the tunnel is to forward a multicast data packet through this transfer path, the data packet is encapsulated in a unicast data packet and sent to the multicast router acting as the terminal end of the tunnel.

Routers on the transfer path that are not multicast-capable forward this encapsulated multicast data packet as a standard unicast data packet. The multicast router acting as the endpoint of the tunnel extracts the encapsulated multicast data packet from the unicast packet and multicasts the packet. A public experimental network known as Mbone (Multicast Backbone) has been set up over the Internet using this technology. Japanese laid-open patent publication number Hei 10-242962 and U.S. Pat. No. 6,259,701 present technologies for allowing multicast data packets to be received by receiving terminals that do not support multicast functions. In both of these technologies, multicast data packets are received by a multicast gateway, and these data packets are sent to individual receiving terminals. The receiving terminals issue requests to the multicast gateway to receive data packets. The reception requests the Japanese laid-open document includes a message containing group information for the packets that are to be received is issued to the multicast gateway. The multicast gateway in the above U.S. Pat. No. provides the receiving terminal with a list of information that can be multicast in a manner similar to a WWW server. The receiving terminal uses a WWW browser to select information to be received from this list. The multicast gateway sends copies of received data packets to the multiple receiving terminals requesting data.

Distributing data via multicasting requires that all the routers and terminals on the network are equipped with multicast functions. Currently, the number of multi-castcapable terminals is growing and there are a number of internet service providers (ISP's) that provide multicasting services. Providing multicasting services to more users, however, requires making more terminals and routers multicast-compatible. This involves a very high cost.

The Japanese laid-open document describes how a service can be provided even if a terminal is not multicast-compatible, but the terminal requires the addition of a function for issuing messages to a multicast gateway about a group to be received. It is expected that mobile terminals and mobile telephones will be connected to the Internet in the future; time and money would be required to add features to these terminals for receiving multicast data packets. The technology in the U.S. Pat. No. uses a WWW browser so there is no need to add new features. The multicast gateway therein internally stores a database of multicast information. Using this database, CGI (Common Gateway Interface) processing is used to generate a list of information to be provided to terminals. This operation is performed when a terminal accesses the multicast gateway, but CGI involves a high processing load and service can be affected by the processing load if a large number of terminals accesses the gateway.

Thus, there is a need for improved multicasting technology.

BRIEF SUMMARY OF THE INVENTION

In the context of a system for providing a multicast data delivery service, the present invention provides a device and a system that allows terminals not supporting multicast functions to reliably receive the same services received by terminals supporting multicast functions without requiring the addition of special functions. A multicast communication device is installed between a multicast network and a network that does not support multicasting. If access to a multicast delivery server is detected from a terminal that does not support multicasting, or a terminal that cannot receive multicast data packets because its network does not support multicasting, the multicast communication device issues a join group request to the closest multicast router in place of the terminal.

The multicast router treats the join group request from the multicast communication device as if it were sent from the terminal and sends the multicast delivery server a request for multicast data packets. This delivery request is processed by the multicast communication device and the multicast router that is between the multicast communication device and the multicast delivery server, and a multicast delivery path from the multicast delivery server to the multicast communication device is established. The multicast communication device stores the address of the terminal that sent the request to access the delivery server. When a multicast data packet is received, the data packet is sent to this terminal.

Information about the delivery server and about the services provided by the delivery server are set up ahead of time in the multicast communication device. The delivery server information includes the server address, the URL to be accessed for receiving a service, and the like. The service information includes the multicast group address used for data delivery and the like. This information can be set up by the network administrator in the multicast communication device or it can be sent from the delivery server. The multicast communication device compares the access content from the terminal not supporting multicasting with the multicast service information stored in the multicast communication device. If there is matching information, a join group request is issued for the multicast group used by the corresponding service.

The multicast communication device monitors the access status of all the terminals. If there is a change in access status, the transmission of data packets to the terminal is stopped. For example, if the multicast communication device detects that a terminal is accessing a URL for a service other than the URL of a service that it is currently accessing, the data packets for the service being accessed are assumed to be unnecessary and a request to leave the corresponding group is sent to the closest multicast router. The multicast router receiving the leave group request issues a request to stop delivery to the delivery server. Based on the request to stop delivery, the delivery path from the delivery server to the multicast communication device is removed, and the data packets are no longer forwarded.

This embodiment makes it possible to reduce the number of communication devices to install when providing a multicast delivery service for a network not equipped with multicast functions. Thus, the burden on the network administrator and the communication device costs can be reduced. These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 3 is a multicast service information table.

FIG. 4 illustrates an access terminal management table.

FIG. 5 illustrates a group management table.

DETAILED DESCRIPTION OF THE INVENTION

The disclosures of all articles and references, including patent documents, mentioned in this application are incorporated herein by reference for all purposes. Embodiments of the present invention are now described.

Figure 6:
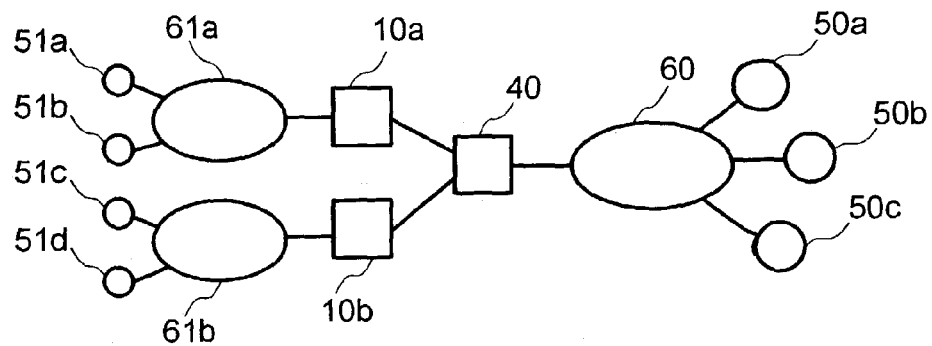
FIG. 6 is a drawing showing the architecture of a network system equipped with a router device based on the first embodiment.

FIG. 6 illustrates the architecture of a network system based on a multicast communication device in which the present invention is implemented. Multicast communication devices 10a, 10b are connected to a multicast network 60 by way of a multicast router 40. Multicast communication devices 10a, 10b are each connected to networks 61a, 61b, which are not multicast-capable. Multicast network 60 connects delivery servers 50a (address is S1), 50b (address is S2), and 50c (address is S3). Network 61a connects terminals 51a (address is H1) and 51b (address is H2). Network 61b connects terminals 51c (address is H3) and 51d (address is H4). Delivery server 50a multicasts data packets to a group address G1. Delivery server 50b multicasts data packets to group addresses G21, G22. These addresses are described in more detail later.

Figure 1:
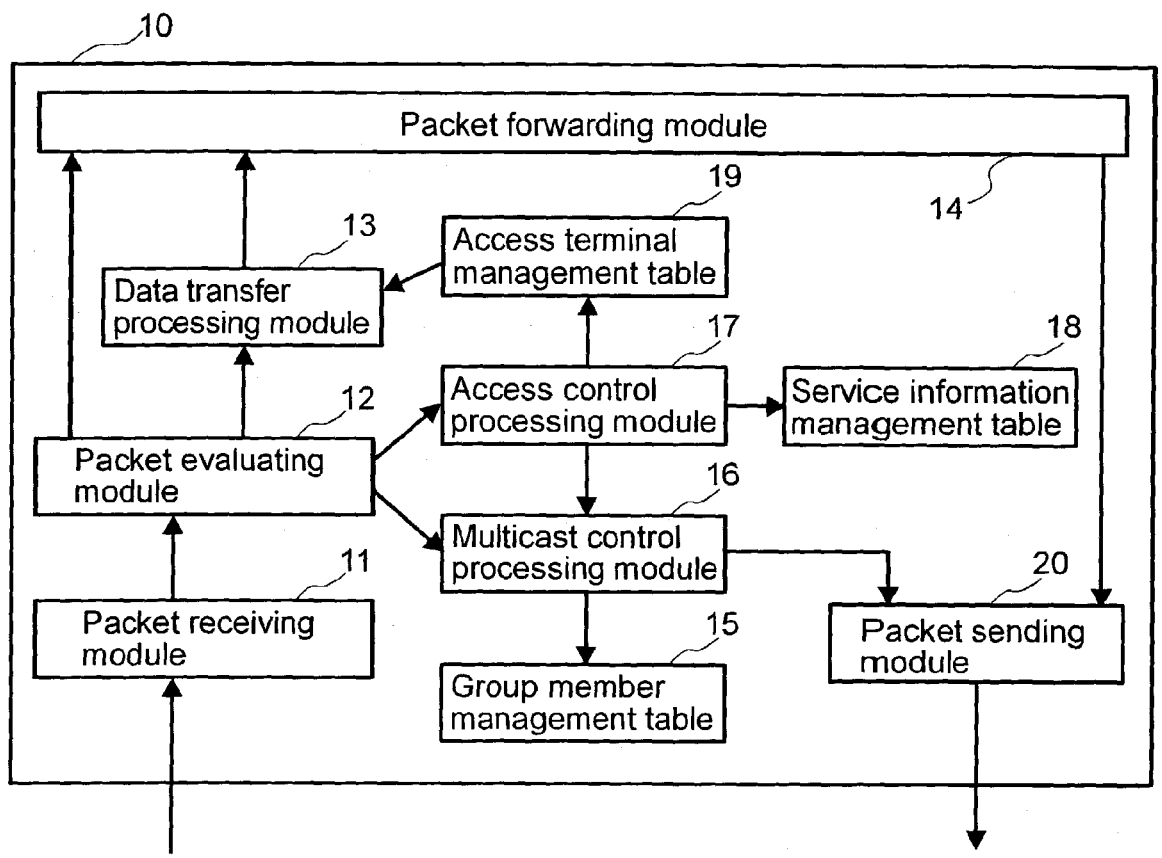
FIG. 1 is a block diagram showing the architecture of a multicast communication device according to a first embodiment.

FIG. 1 is a block diagram of multicast communication device 10 according to a first embodiment of the present invention. Multicast communication device 10 includes a CPU, memory, an internal communication line such as a bus, a secondary storage device such as a hard disk, and a communication interface. The communication interface is connected to a network, through which communication with a multicast router, a delivery server, or a terminal is established. The memory stores a program that allow the CPU to implement the operations described later as well as necessary data. The program and data can be stored ahead of time or can be introduced from another server via a communication medium or other medium on the network or they can be introduced from the secondary storage device.

The multicast communication device 10 uses a receiving module 11 to receive multicast data packets, packets from the terminal 51 requesting access to the delivery server 50, and control packets relating to multicast control operations from the nearest multicast router 40. When delivery server 50 sends service information to multicast communication device 10, the packet containing this service information is also received by receiving module 11. Next, a packet evaluating module 12 determines whether a received packet is one of the packets mentioned above.

First, if packet evaluating module 12 determines that a data packet was received, the operation is passed on to a data transfer processing module 13. Data transfer processing module 13 searches an access terminal management table 19, obtains information about terminals that should receive the multicast group information, sets up the destination address in the received data packet to be the address information for these terminals, and passes on the information to a packet forwarding module 14. A packet sending module 20 sends data packets forwarded by the packet forwarding module 14 and group management protocol packets issued by a multicast control module 16.

If, instead, if packet evaluating module 12 determines that an access request packet was received, the operation is transferred to an access control processing module 17. Access control processing module 17 extracts the access information from the received packet and determines if it matches service information stored in a service information management table 18. If there is matching service information, access control processing module 17 registers the information about terminal 51 issuing the access request in access terminal management table 19. Access control processing module 17 then sends multicast control module 16 the multicast group information registered in this service information and the address information of delivery server 50. Multicast control module 16 receives the group information and the delivery server address information received from access control processing module 17, registers this information in a group management table 15, and uses the group management protocol to send a join group request to the closest multicast router 40.

Third, if packet evaluating module 12 determines that a packet with service information was received, the operation is transferred to access control processing module 17. Access control processing module 17 extracts the service information from the packet and registers this information in service information management table 18.

Fourth, if packet evaluating module 12 determines that a control packet relating to multicast control processing was received, the operation is transferred to multicast control module 16. This control packet is a protocol packet sent by a multicast router and used to control multicast forwarding. Multicast control module 16 performs protocol operations based on the type of control packet received.

Figure 2:
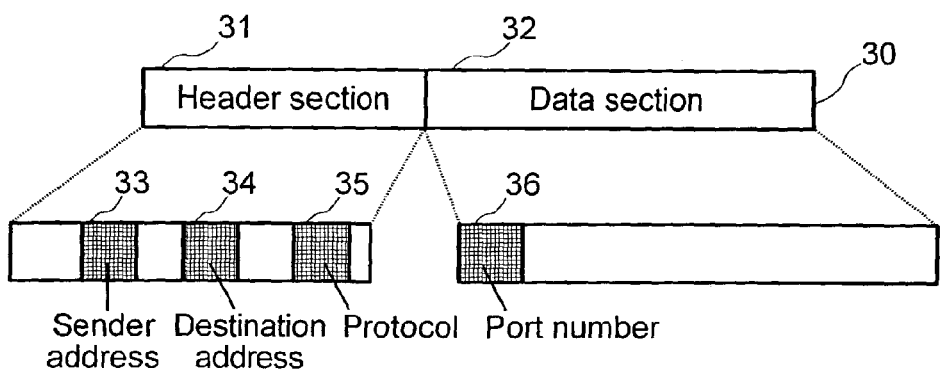
FIG. 2 is a packet format handled by a multicast communication device.

FIG. 2 shows the format of a packet 30 processed by multicast communication device 10. Packet 30 is formed from a header 31 and a data section 32. Header section 31 includes a source address 33, a destination address 34, and protocol information 35 for the packet 30. In the case of a packet issued by terminal 51 to request access to delivery server 50, a terminal sets up the address of distribution server 50 in destination address 34. In the case of a data packet multicast by delivery server 50, the multicast group address is set up in destination address 34. If multicast communication device 10 is to transfer a multicast data packet to terminals 51, data transfer processing module 13 of multicast communication device 10 sets up the addresses of terminals 51 in destination address 34. Data section 32 includes the information for layer 4 through layer 7 of the OSI reference model. A port number 36 that the communication application uses is included in the layer 4 information. Information such as the URL of delivery server 50 accessed by terminal 51 is included in data section 32.

FIG. 3 shows service information management table 18. The service information registered in service information management table 18 includes access information to delivery server 50 [of FIG. 6] providing the multicast delivery service and data packet information to be multicast by delivery server 50. The access information includes a delivery server address 182, a protocol 183 to be used when accessing delivery server 50, a port number 184, URL information 185 indicating the access target, and the like. The multicast data packet information includes a multicast group address 186 and additional information 187. Service information management table 18 also includes information 188 indicating current reception status. Additional information 187 can include, for example, service availability times and the like. If there is an access request outside the service availability times, join group requests are not sent, thus limiting unnecessary transmission of control packets.

Multicast communication device 10 of FIG. 6 monitors the access status from terminals 51 and performs operations based on the number of receiving terminals. Access control processing module 17 [FIG. 1] enters the number of terminals receiving the service in status 188 of service information management table 18 and also sends requests to multicast control module 16 based on this number of terminals. If the number of terminals changes from 0 to 1, a data packet receive request is sent, and if the number of terminals changes from 1 to 0, a message to stop reception of data packets is sent. Otherwise, no message is sent. Delivery server address 182 must be included in the access information in service information management table 18. Entries are not required for protocol 183, port number 184, and URL information 185. Different combinations can be used; e.g., delivery server address 182 can be set, or delivery server address 182, protocol 183, and port number 184 can be set.

Packet evaluating module 12 of multicast communication device 10 [shown in FIG. 1] compares the contents of header section 31 and data section 32 [FIG. 2] of the received packet with the contents entered in service information management table 18. The comparison is performed only for the fields that are registered. If there is a service for which all the entered fields match, a join group request is issued for that multicast group. One or more group addresses used by a service can be entered in group address 186. Multicast control module 16 of multicast communication device 10 issues a join group request for each multiple group address 186 entry in the service for which access is requested.

In the example shown in FIG. 3, if packet evaluating module 12 detects that terminal 51 accessed delivery server 50 having the address S1 with a packet on port number 80 using the TCP protocol, multicast control module 16 issues a join request for group G1 regardless of the URL to which access was attempted. If packet evaluating module 12 detects that terminal 51 accessed delivery server 50 having the address S2 with a packet on port number 80 using the TCP protocol with an access target URL of url1, multicast control module 16 issues a group join request for group G21 and group G22.

Delivery server 50 generates a packet in which data section 32 of data packet 30 contains information relating to the delivery server (hereinafter referred to as service information), e.g., the delivery server address, protocol, port number, URL, and the multicast group address. This packet is sent to multicast communication device 10. Delivery server 50 sends the service information to multicast communication device 10 or multicasts the information using a predetermined multicast group address. The transmission method can be set by the network administrator. If the service information is be multicast, multicast communication device 10 will be able to receive the service information by joining the corresponding multicast group. Instead of having the service information sent from delivery server 50, it would also be possible to have the service information set up directed by the network administrator via an administrator terminal (not shown in the figures) or the like.

FIG. 4 shows access terminal management table 19. Access terminal management table 19 includes: an address 191 field for the address of receiving terminal 51 requesting access to delivery server 50; a service information 192 field for the requested service; and time information 193 indicating the time at which the access request was detected. Time information 193 can be used for accounting purposes to calculate the times during which the service was used by each of terminals 51. Request service 192 is used for indexing information for the services stored in service information management table 18, Information about terminals 51 accessing delivery server 50 is entered in access terminal management table 19. Access status is monitored, and when access is stopped, the information for terminal 51 is removed from access terminal management table 19.

FIG. 5 shows group management table 15. Group management table 15 includes group address information 151 indicating the group to which the join request is being issued and address information 152 of the terminal (corresponds to delivery server 50) sending data packets to this group address. Sending terminal address information 152 does not need to be entered. When issuing a join/leave group request, the sending terminal address and the group are combined as appropriate to indicate the target. Sending terminal address information 152 is set up when the multicast control module 16 receives a request to start access from access control processing module 17 and is removed when a request to stop access is received.

In FIG. 6, the contents shown in FIG. 3 are entered in the service information management table 18 of each of the multicast communication devices 10a, 10b, and an ID 181 is assigned to each of the service information fields. When terminal 51a sends a request to access delivery server 50a, access control processing module 17 of multicast communication device 10a detects the access request. If it is found to match the service information with ID 1, address H1 of terminal 51a and the service information ID to be accessed, i.e., 1, is entered in access terminal management table 19.

Since the service information ID entered in the service information management table 18 is 1, multicast control module 16 determines that the terminal accessing delivery server 50a is the first. Group address G1 and the address S1 of delivery server 50a are entered in group management table 15 and a request to participate in group G1 is sent to multicast router 40 using the group management protocol.

Multicast router 40 receives the join group request and sends a delivery request to multicast network 60. As a result, the multicast data packets sent by delivery server 50a to group G1 arrive at multicast communication device 10a. When multicast communication device 10a receives a data packet addressed to group G1, data transfer processing module 13 looks up access terminal management table 19 to determine if any terminals are to receive the data packet. Since access terminal management table 19 indicates that terminal 51a is to receive service information with ID=1, the destination address of the received data packet is set to H1 and the packet is forwarded to terminal 51a.

If terminal 51b sends an access request to delivery server 50a as in the case of terminal 51a, access control processing module 17 of multicast communication device 10a detects the access request and enters the information for terminal 51b in access terminal management table 19. The status of the service information with ID=1 entered in service information management table 18 indicates that there is a terminal already accessing delivery server 50a and that a join request has already been issued for group G2. Thus, multicast control module 16 does not issue a join group request to. Since terminal 51a and terminal 51b are registered in access terminal management table 19, when multicast communication device 10a receives subsequent data packets addressed to group G1, data transfer processing module 13 sets up destination addresses H1 and H2 for received data packets and forwards them to terminal 51a and terminal 51b.

If terminal 51c issues an access request for delivery server 50a, access control processing module 17 of multicast communication device 10b detects the access request, and multicast control module 16 issues a join group request for group G1. In response to the join group request, multicast router 40 forwards the data packets addressed to group G1 to multicast communication devices 10a and 10b. Data transfer processing module 13 of multicast communication device 10b receives data packets addressed to group G1 and, since terminal 51c is in access terminal management table 19, forwards the received data packets to terminal 51c by setting up the destination address as H3.

If terminal 51d issues an access request for delivery server 50b, access control processing module 17 of multicast communication device 10b detects the access request and information about terminal 51d and the accessed service ID (=2) are entered in access terminal management table 19. Based on the status of the service information with ID=2 in service information management table 18, it is determined that terminal 50d is the first terminal accessing delivery server 50b. Group G21 and group G22 and the address S2 of delivery server 50b are entered in group management table 15, and multicast control module 16 issues join group requests for group G21 and group G22.

When data packets addressed to group G1 are received by data transfer processing module 13, the destination addresses of these data packets are changed to H3 and sent to terminal 51c. When data packets addressed to group G21 or group G22 are received, the destination addresses of these data packets are set to H4 and sent to terminal 50d.

Multicast control module 16 of multicast communication device 10 monitors the access status of each of the terminals. If a change is detected, it assumes that data packets do not need to be forwarded, and a request to leave the group is issued. Changes in access status can include a terminal 51 accessing another service, a receiving terminal stopping access, and an inability to send data from multicast communication device 10 to a terminal 51 because of a failure or the like.

As an example of a change in access status, a case where a terminal 51 accesses a different delivery server 50 is described. If terminal 51c accesses delivery server 50b while it is accessing delivery server 50a, access control processing module 17 of multicast communication device 10b compares the access request from terminal 51c with the information relating to terminal 51c in access terminal management table 19. Since the ID of the service being accessed is "1" and the newly accessed service information has an ID of "2", it is determined that the service to be received has changed. The terminal count in service information management table 18 for the service with an ID of "1" being accessed by terminal 50c is decremented by 1. Since only terminal 51c is accessing delivery server 50a via multicast communication device 10b, the terminal count for this service becomes 0. Multicast control module 16 of multicast communication device 10b no longer needs data packets addressed to group G1 from delivery server 50a, so a request to leave the group G1 is issued.

Next, access control processing module 17 increments by 1 the terminal count of the service information with an ID of "2" in service information management table 18 for delivery server 50b. Because terminal 51d is already accessing delivery server 50b, a request to join the group is not issued. The service ID for terminal 51c is changed from "1" to "2" in access terminal management table 19. As an example of when access from a terminal 51 stops, a case where the TCP connection is monitored is described. When a terminal uses TCP, a TCP SYN packet is issued and a request is made to establish a TCP connection. When an existing TCP connection is to be stopped, a TCP FIN packet is sent. If access control processing module 17 of multicast communication device 10 detects that a terminal 51 that is currently accessing a server issues a FIN packet, it is assumed that access terminal 51 has finished accessing delivery server 50. The terminal count in the associated service information management table 18 is decremented by 1, and the information for terminal 51 is removed from access terminal management table 19.

If multicast communication device 10 cannot send data to a terminal 51, it may be because there is a failure at terminal 51 or there is a failure in the network on the way to terminal 51. In either case, if data packets forwarded by multicast communication device 10 do not reach their destination, an ICMP packet indicating that a packet could not be delivered is issued to the data packet source either from terminal 51 or a router along the route. Access control processing module 17 of multicast communication device 10 uses the contents of the ICMP packet and the current information in access terminal management table 19 to determine that access terminal 51 cannot receive data. The terminal count in service information management table 18 is decremented by 1 and information about terminal 51 is removed from access terminal management table 19.

Figure 7:
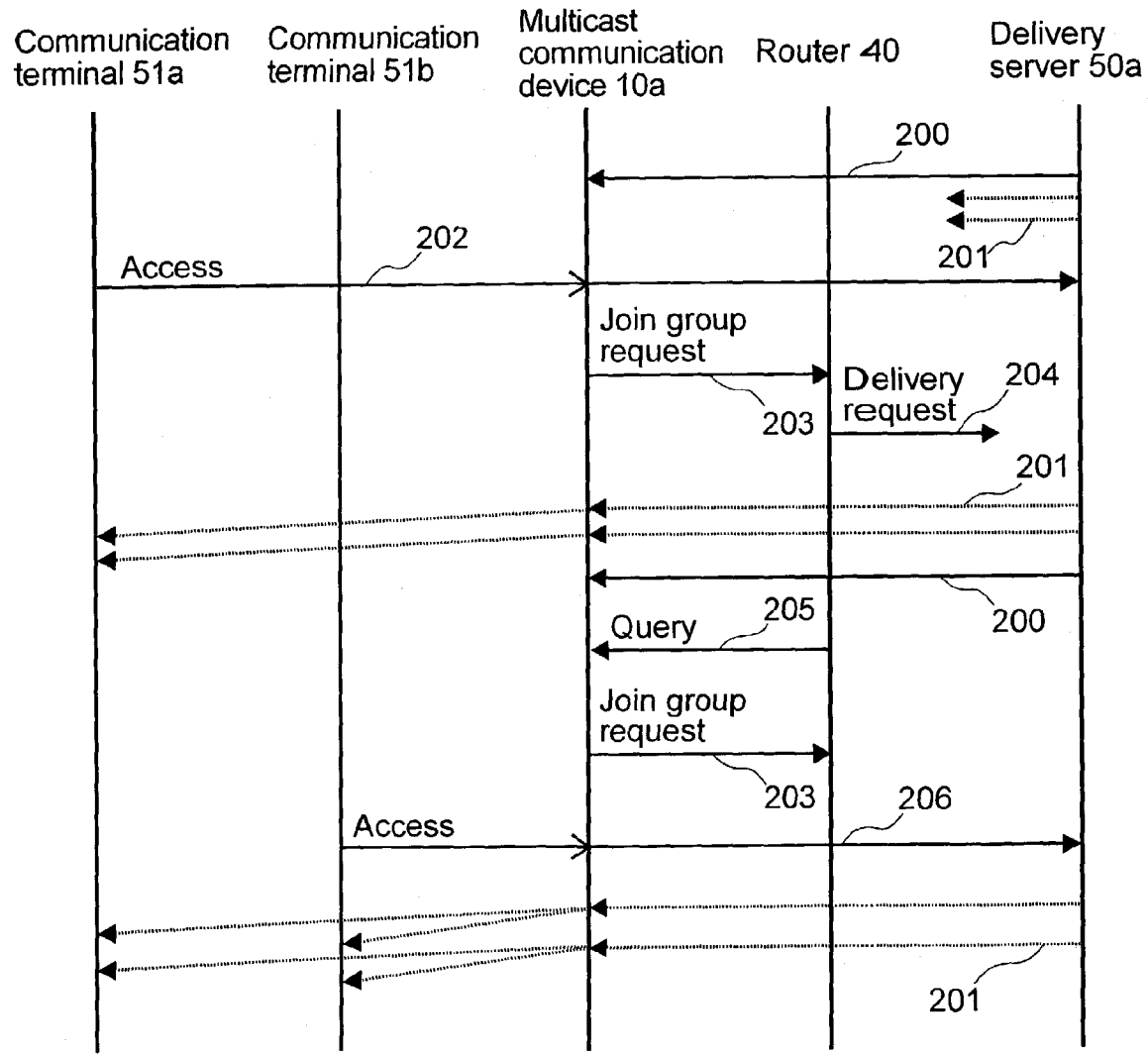
FIG. 7 illustrates a message sequence that takes place when two terminals access a delivery server at the same time.

FIG. 7 shows the message sequences involved when a data packet is received by terminals 51a, 51b from delivery server 50a in the architecture shown in FIG. 6. In this example, delivery server 50a periodically sends service information 200 to multicast communication devices 10a, 10b, and a data packet 201 is multicast to group G1. Service information management table 18 of multicast communication device 10a contains the information shown in FIG. 3.

Terminal 51a sends an access request 202 via TCP to port number 80 of server 50a (address S1). Access control processing module 17 of multicast communication device 10a looks at the content of access request 202 and multicast control module 16 sends a join group request 203 for multicast group G1 for the corresponding service. Multicast router 40 receives join group request 203 and sends a delivery request 204 requesting delivery of data packets addressed to group G1.

Data transfer processing module 13 of multicast communication device 10a receives data packet 201 addressed to group G1 and changes the destination address of data packet 201 to H1 of terminal 51a and forwards the packet to terminal 51a. Multicast router 40 periodically sends a group query packet 205 to see if any terminals are participating in a multicast group. Multicast control module 16 of multicast communication device 10a receives group query request 205 and replies with a join group request 203 for group G1 entered in group management table 15.

Similarly, terminal 51b then issues an access request 206 via TCP to port number 80 of delivery server 50a. Access control processing module 17 of multicast communication device 10a detects access request 206 and enters the information of terminal 51b in access terminal management table 19. Since terminal 51a is already accessing delivery server 50a, a join group request is not issued. When subsequent data packets addressed to group G1 are received by data transfer processing module 13 of multicast communication device 10a, the destination address of data packet 201 is changed to H1 of terminal 51a and the address H2 of terminal 51b, and the packet is sent to these terminals.

Figure 8:
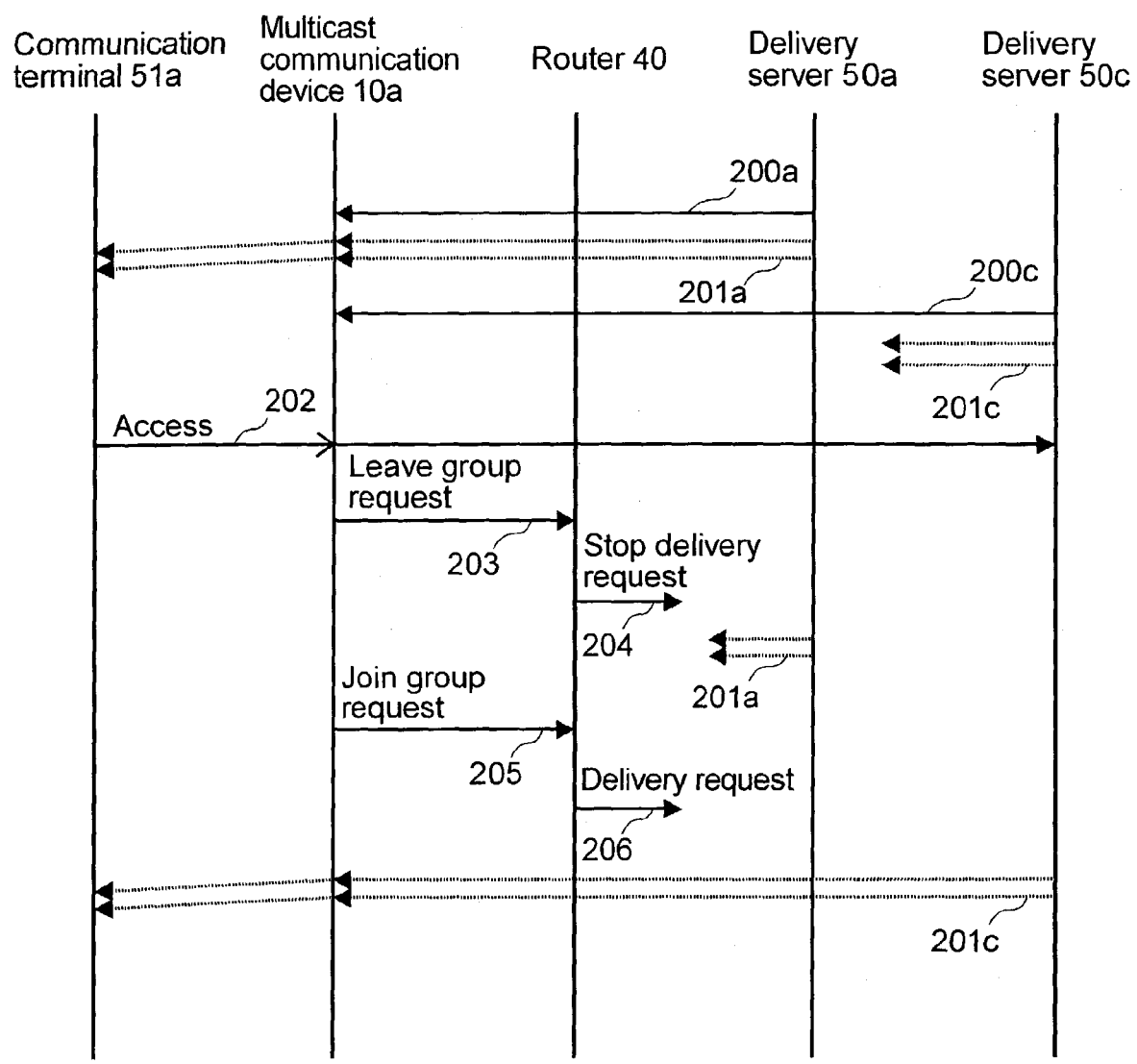
FIG. 8 illustrates a message sequence that takes place when a terminal changes the delivery server that it is accessing.

FIG. 8 shows the message sequences involved when terminal 51a switches from accessing delivery server 50a to delivery server 50c in the architecture shown in FIG. 6. In this example, delivery server 50a periodically sends service information 200a to multicast communication devices 10a, 10b and multicasts data 201a to group G1. Delivery server 50c also sends service information 200c to multicast communication devices 10a, 10b, and multicasts data packet 201c to the group G3. The contents of service information management table 18 of multicast communication device 10a are as shown in FIG. 3.

Referring to the message sequence in FIG. 8, terminal 51a issues an access request 202 via TCP to delivery server 50c using the URL "url2" while it is already receiving data packets from delivery server 50a. The access control processing module 17 of the multicast communication device 10a detects access request 202 and compares it with the information for terminal 51a in the access terminal management table 19. It is determined that the access contents are different, and multicast control module 16 of multicast communication device 10a issues a leave group request 203 for group G1 to stop data from delivery server 50a.

Multicast router 40 receives the leave group request 203 and sends a stop delivery request 204 to stop data packets addressed to group G1. Next, a join group request 205 for group G3 is sent so that data packets can be received from delivery server 50c. Multicast router 40 receives join group request 205 and sends a delivery request 206 to request delivery of data packets addressed to group G3. Data transfer processing module 13 of multicast communication device 10a receives a data packet 201c multicast to group G3 by delivery server 50c and forwards data packet 201c by setting the destination address to H1 of terminal 51a.

Figure 9:
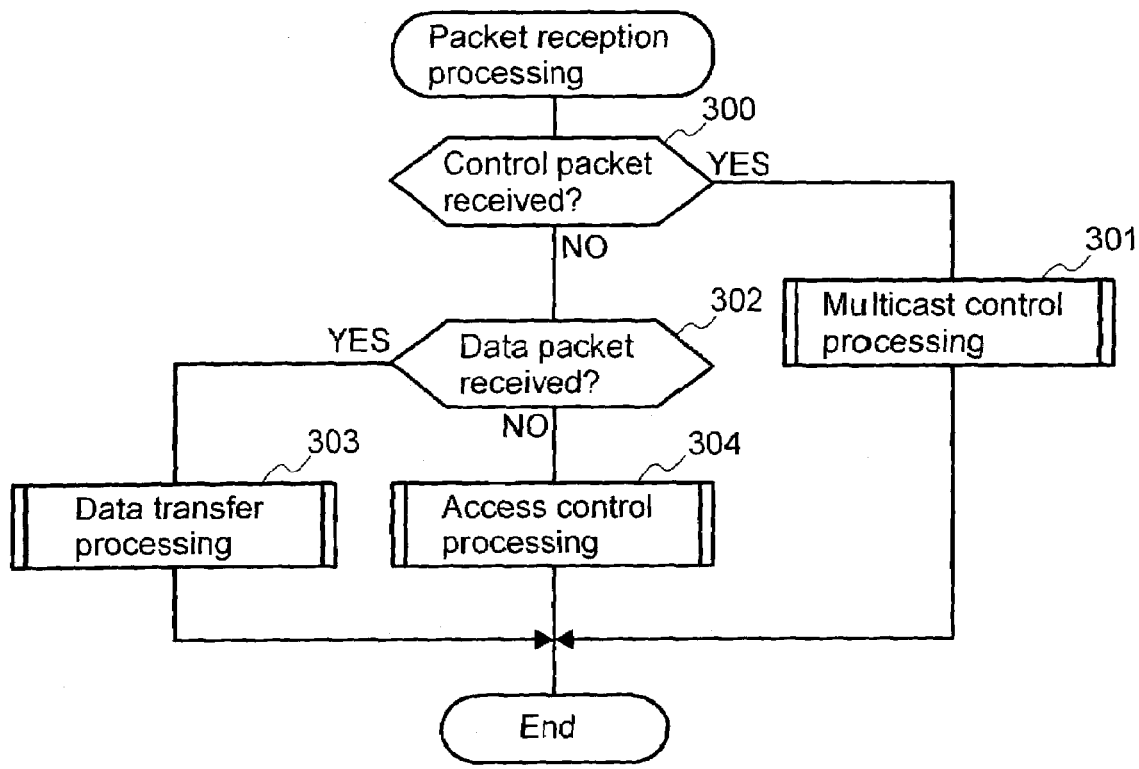
FIG. 9 is a flowchart showing operations performed when a packet is received.

FIG. 9 shows the flow of operations performed when a packet is received. A received packet is checked to see whether it is a data packet multicast by a server, an access request packet from a terminal 51 to the server, or a multicast control packet. If service information is sent from delivery server 50, the packet is checked to see if it contains service information. A multicast control packet is a packet relating to multicast forward control sent from the closest multicast router 40. At step 300, a multicast control operation 301 is performed if a multicast control packet was received. If the packet is not a multicast control packet, step 302 checks whether it is a data packet. These evaluations can be made by seeing if the destination address of the received packet is entered in the service information management table 18. If the packet is a data packet, a data transfer operation 303 is performed. If the packet is not a data packet, an access control operation 304 is performed.

Figure 10:
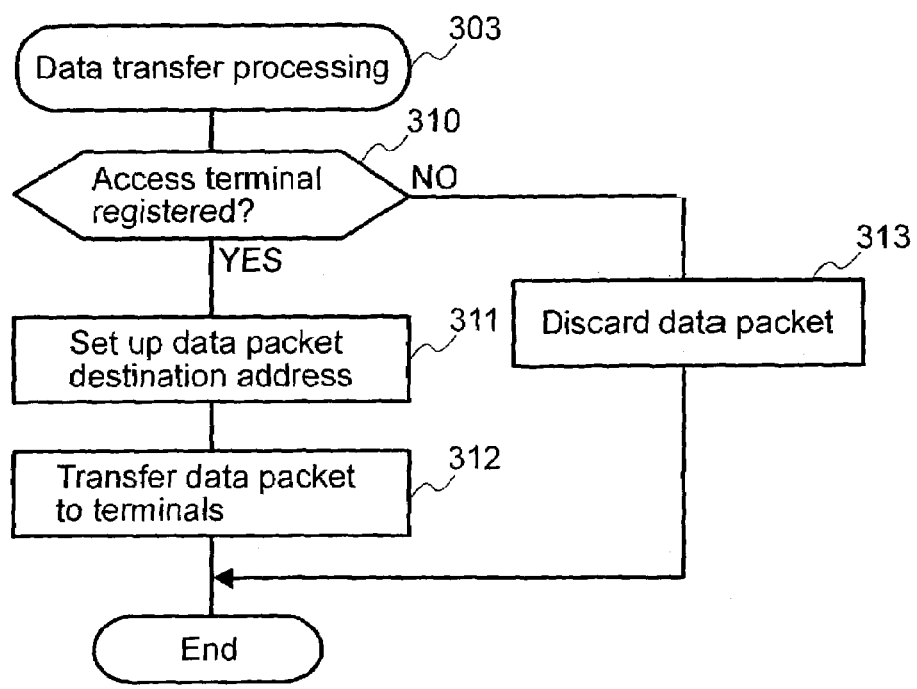
FIG. 10 is a flowchart of a data forwarding operation.

FIG. 10 shows the flow of operations performed in data transfer operation 303 referred to above. Access terminal management table 19 and service information management table 18 are checked to see if there are any terminals 51 that should receive the incoming data packet (step 310). If terminal 51 issuing the access request is registered, the destination address is set to the addresses of terminals 51 (step 311) and the received data packet is transferred to these terminals 51 (step 312). If there are no registered terminals 51, the data packet is discarded (step 313).

Figure 11:
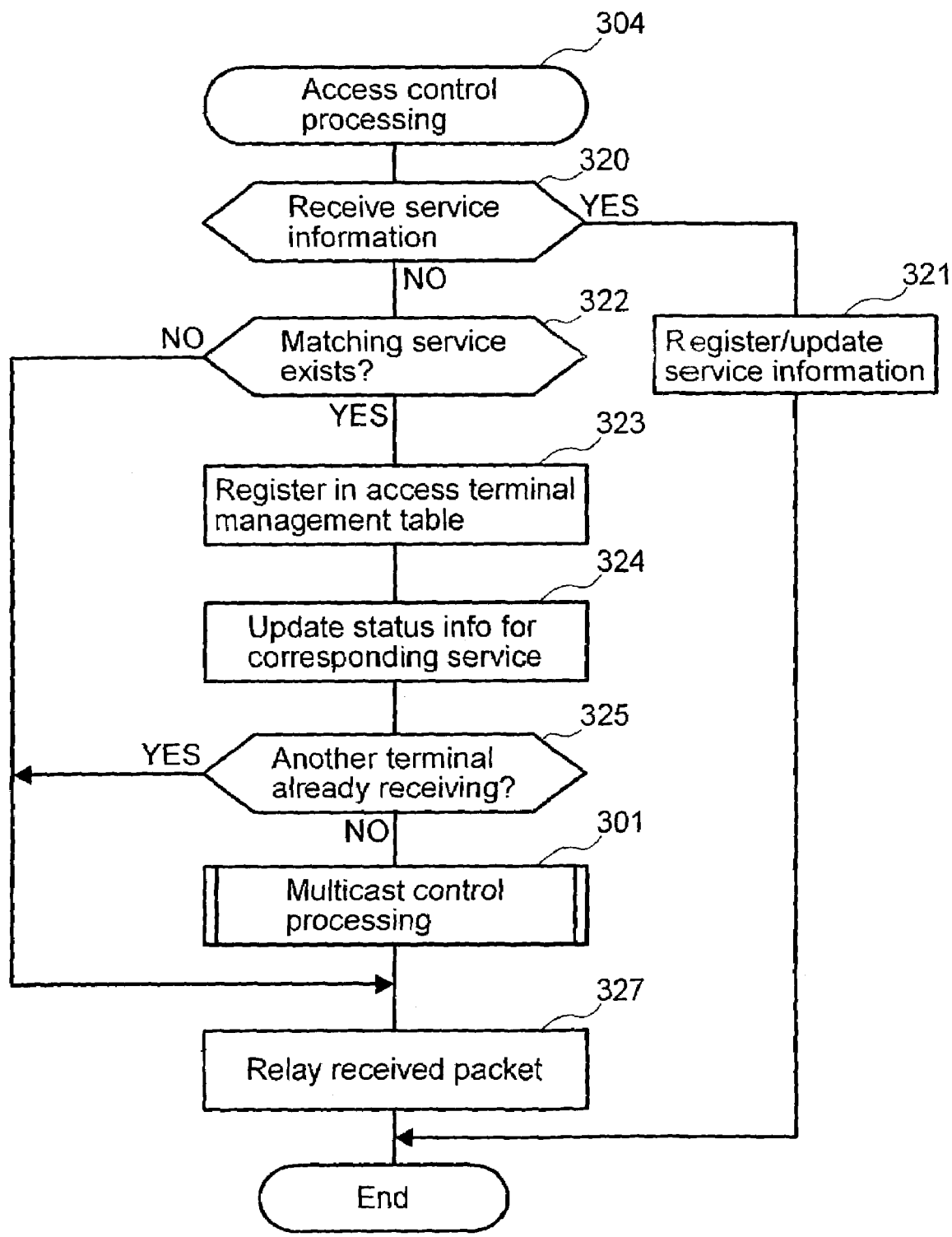
FIG. 11 is a flowchart of an access control operation.

FIG. 11 shows the flow of operations performed in access control operation 304 referred to above. The flow of operations here includes cases where service information is sent from delivery server 50. First, the destination address, protocol, and port number of the received packet is examined to determine if it is a packet containing service information or an access request packet (step 320). If the packet contains service information, the service information is entered in service information management table 18 or service information that is already entered is updated (step 321).

If the received packet is an access request packet, the destination address, protocol, port number, and the URL information of the access target are extracted from the received packet to see if the information matches information in service information management table 18 (step 322). If there is no matching service information, the packet is forwarded directly (step 327).

If there is matching service information, information for receiving terminal 51 that sent the access request packet is entered in access terminal management table 19. If the terminal information is already registered and the service information being accessed is different, the information is updated to the new service being accessed (step 323). Next, the service status information, i.e., the terminal count, in service information management table 18 is updated (step 324). If receiving terminal 51 is changing the access target, the terminal count in the information for the service being accessed is decremented and the terminal count in the service information for the new service is incremented. If the updating of terminal counts performed at step 325 results in a service that goes from a terminal count of 0 to 1 or 1 to 0, the multicast control operation 301 described above is performed. Otherwise, it is assumed that there is a terminal 51 that was already receiving the service, and step 327 is executed. Since the access request packet is addressed to delivery server 50, step 327 relays the received packet to delivery server 50.

Figure 12:
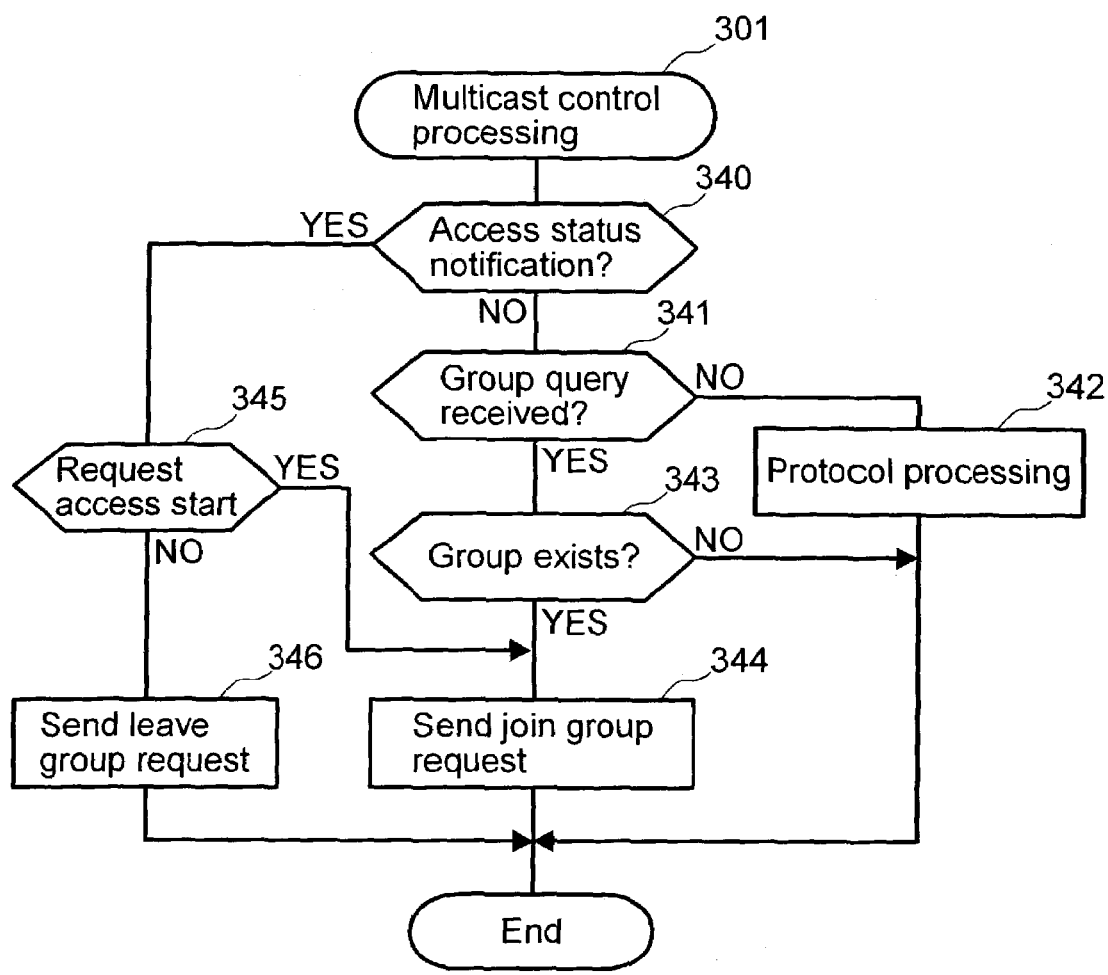
FIG. 12 is a flowchart of a multicast control operation.

FIG. 12 shows the flow of operations performed by multicast control operation 301. First, a determination is made as to whether an access status notification was received from step 325 of access control operation 304 (step 340). If there was a notification from access control operation 304, the message is checked to determine if it is a request to start access or a request to stop access (step 345). If step 345 determines that the access status notification is a request to start access, group information and delivery service address information are entered in group management table 15 and a join group request is issued for the multicast group (step 344). If the notification is a request to end access, the associated group information is deleted from group management table 15 and a leave group request is issued (step 346).

If the notification was not an access information notification at step 340, the packet is checked to see if it is a group participation query (step 341). If the packet is not a group participation query packet, operations are performed based on the received protocol (step 342). If the packet is a group participation query packet, the group member management table is looked up to see if there are any registered groups (step 343). Join Group requests are then issued for all the registered groups (step 344).

Figure 13:
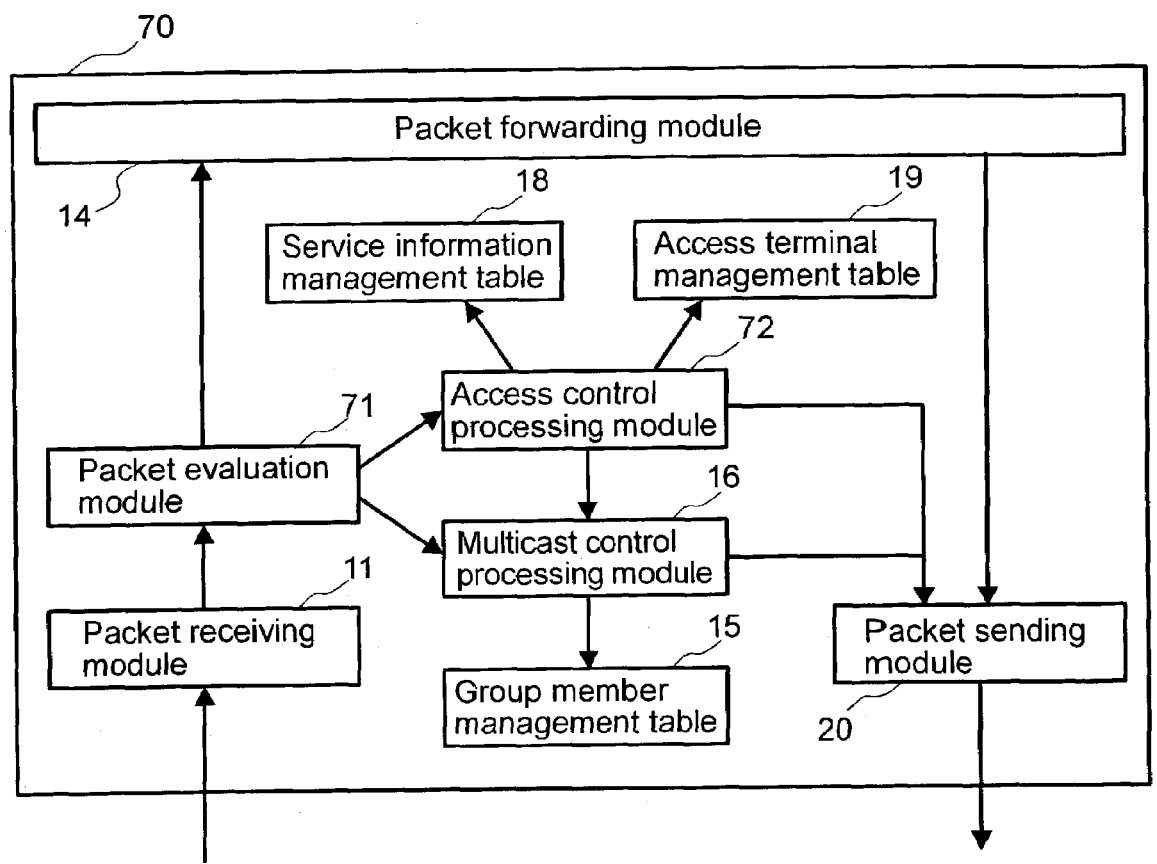
FIG. 13 is a block diagram of a multicast communication device and a data forwarding device according to a second embodiment.
Figure 13:
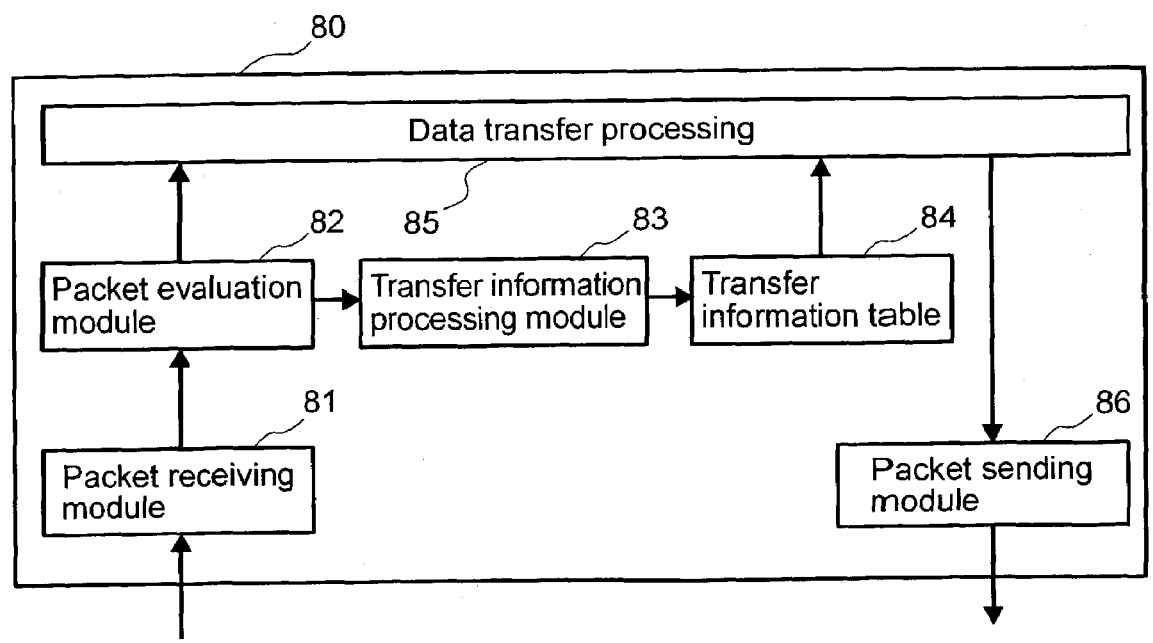

A second embodiment of the present invention is now described in the form of a device for detecting access requests and managing access terminals and a separate device forwarding multicast data packets to access terminals 51. FIG. 13 is a block diagram of a multicast communication device 70 and a data transfer device 80 according to this embodiment. Packet receiving module 11, packet forwarding module 14, multicast control module 16, and packet sending module 20 perform the same operations as in the first embodiment. Group management table 15, service information management table 18, and access terminal management table 19 contain the same information as in the first embodiment.

A packet evaluation module 71 determines whether a packet is an access request packet from a terminal 51 or a packet containing service information from a delivery server 50. If the packet is an access request packet, an access control processing module 72 extracts the access information and sees if it matches service information stored in service information management table 18. If there is a matching service, access control processing module 72 registers information for the terminal 51 issuing the access request in access terminal management table 19. Access control processing module 72 also updates the status in service information management table 18 and notifies multicast control module 16 with the multicast group information registered in the service information and the address information of delivery server 50. Access control processing module 72 also uses receiving terminal information and information in the data packet to be received by the receiving terminal to generate forwarding information used to transfer the packet to access terminals 51. This forwarding information is sent to data transfer device 80. Multicast control module 16 enters the registers the group in group management table 15 and issues a join group request using a group management protocol.

Data transfer device 80 receives the multicast data packet and the forwarding information from multicast communication device 70. Packet evaluation module 82 determines if the received packet is a data packet or a forwarding information notification. If the packet is for forwarding information, it is processed by a transfer information processing module 83. Transfer information processing module 83 generates a transfer information table 84 based on the contents of the received packet. If the received packet is a multicast data packet, it is passed on to a data transfer processing module 85. Data transfer processing module 85 looks up transfer information table 84, sets the address of access terminal 51 in the data packet destination address, and sends the data packet from a packet sending module 86.

Figure 14:
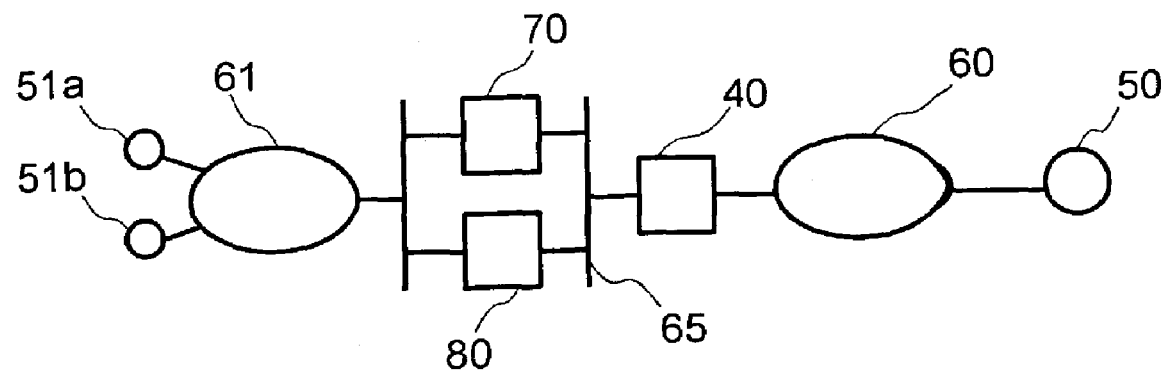
FIG. 14 is a block diagram of a network system equipped with a multicast communication device and a data forwarding device according to the second embodiment.

FIG. 14 shows an example of an architecture of a system according to this embodiment. Multicast communication device 70 and data transfer device 80 are connected to a network 61 that is not equipped with multicast functions. Further, multicast communication device 70 and data transfer device 80 are connected to multicast router 40 via a network 65. Network 65 is a network in which connected devices can access the packets sent through the network 65, e.g., a LAN. Data transfer device 80 monitors the multicast data packets sent through network 65 and captures packets that it has to forward. Access requests from terminals 51*a*, 51*b* are detected by multicast communication device 70, which issues a join group request to multicast router 40. In response to the join group request, multicast router 40 forwards the data packets multicast from delivery server 50.

Since multicast router 40 received the join group request via network 65, data packets are forwarded over the network 65. Thus, data transfer device 80 can also receive the multicast data packets as described above. Data transfer device 80 looks up transfer information table 84 and detects the data packets going through the network 65 that should be forwarded. These packets are transferred to terminal 51*a* or 51*b*. This embodiment provides similar advantages to those of the first embodiment. The processing load can be reduced since access control operations and data forwarding operations are separated. Multiple data transfer devices 80 can be installed to further distribute the processing load.

Next, a third embodiment, in the form of a multicast communication device 90 equipped with a multicast routing function is described with reference to FIG. 15. Packet evaluating module 12, packet forwarding module 14, and multicast control module 16 in the block diagram of multicast communication device 90 of this embodiment perform different operations from those of the first embodiment, whereas packet receiving module 11, data transfer processing module 13, access control module 17, and packet transfer module 20 perform the same operations as in the first embodiment. Group management table 15, service information management table 18, and access terminal management table 19 contain the same information as in the first embodiment.

If a packet received by packet evaluating module 12 is a multicast data packet, the data packet is passed on to data transfer processing module 13 and packet forwarding module 92. If associated access terminal information exists, data transfer processing module 13 sets the address information to the address of access terminal 51 and passes the packet to packet forwarding module 92. Packet forwarding module 14 has a multicast forwarding function and multicasts data packets when necessary.

If access from a terminal 51 is detected, access control processing module 17 registers the terminal information in access terminal management table 19 and sends notification of group information and the address information of delivery server 50 to multicast control module 16. Multicast control module 16 uses a multicast routing protocol to send a request for delivery of data packets addressed to the group.

Figure 15:
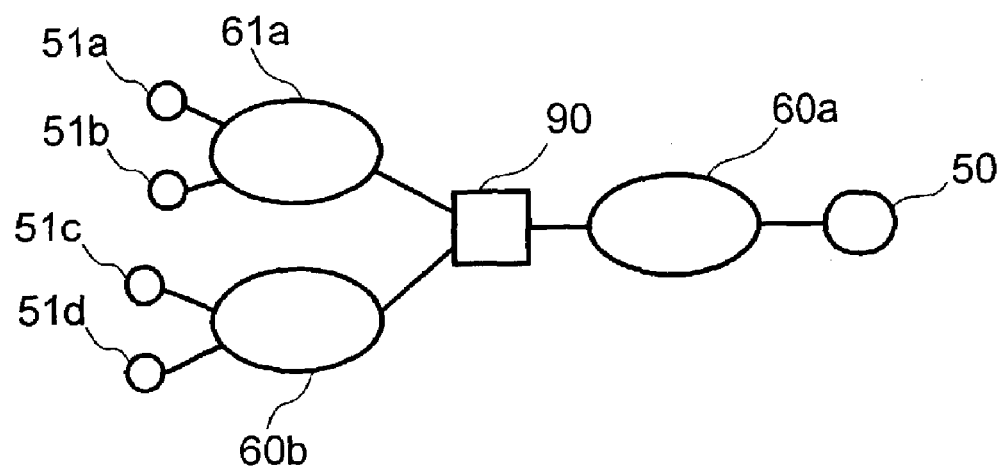
FIG. 15 is a diagram of the architecture of a network system equipped with a multicast communication device according to a third embodiment.

FIG. 15 shows an example of an architecture for a system based on this embodiment. Multicast communication device 90 is connected to multicast networks 60a and 60b and a network 61a not equipped with multicast functions. Delivery server 50 is connected to multicast network 60a, and receiving terminals 51c, 51d are connected to multicast network 60b. When a multicast data packet from delivery server 50 is received, multicast communication device 90 multicasts the packet to the terminals 51c, 51d and transferred the data packets to the terminals 51a, 51b.

Figure 16:
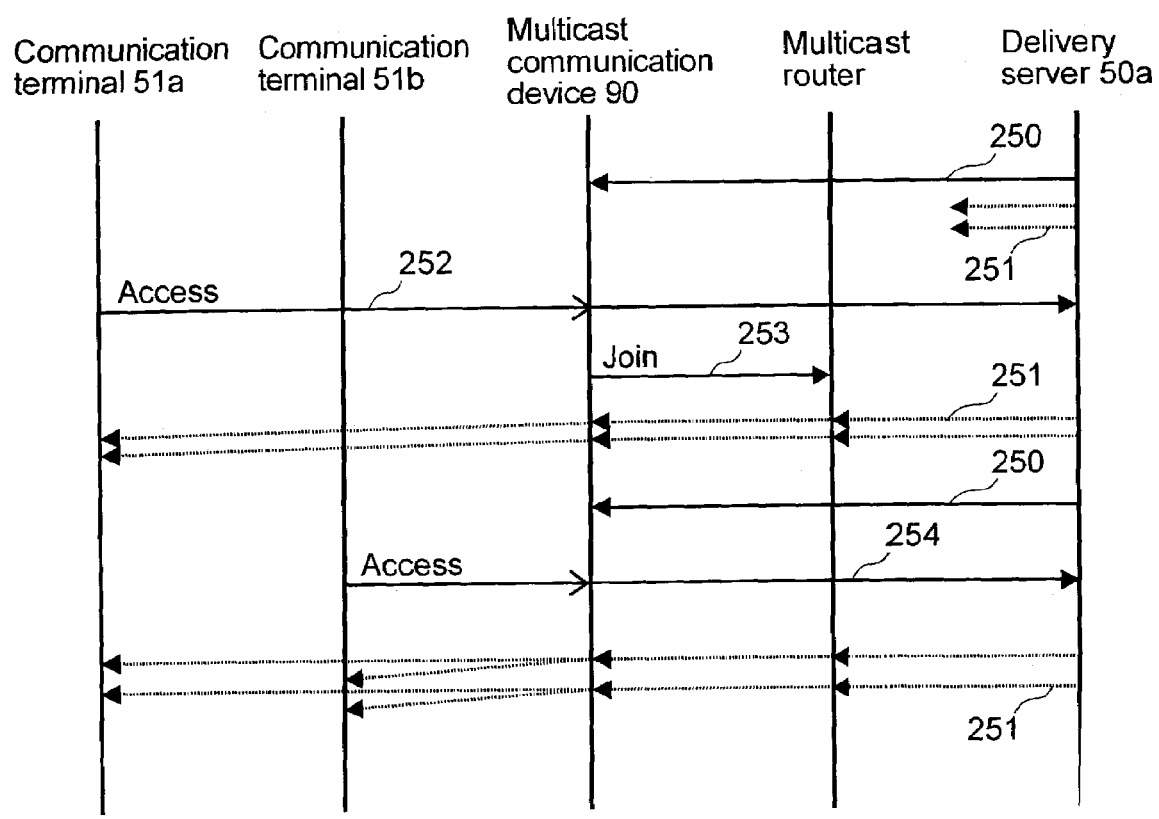
FIG. 16 illustrates a message sequence that takes place in the third embodiment.

FIG. 16 shows message sequences that take place when multicast communication device 90 of this embodiment uses PIM-SM as the multicast routing protocol. Delivery server 50 periodically sends service information 250 to multicast communication device 90 and multicasts data packets 251 to group G1. When terminal 51a sends an access request 252 to delivery server 50a, multicast communication device 90 along the path of the request detects the access request 252 and sends a PIM-SM JOIN packet 253 requesting data packet delivery. The multicast router in multicast network 60 receives JOIN packet 253 and begins sending data packets addressed to group G1 to multicast communication device 90. Multicast communication device 90 receives these data packets 251, sets the destination address of the data packet 251 to H1 of the terminal 51a, and forwards the packet to terminal 51a.

Similarly, when terminal 51b sends an access request 254 to delivery server 50a, multicast communication device 90 along the path detects access request 254. Since terminal 51b belongs to the same group G1, multicast communication device 90 does not send a new JOIN packet 253. Multicast communication device 90 receives data packets 251, sets the destination address to H1 of terminal 51a and H2 of terminal 51b and forwards the two resulting data packets 251.

The specification and drawings are, accordingly, to be regarded in an illustrative rather than a restrictive sense. It will, however, be evident that various modifications and changes may be made thereto without departing from the broader spirit and scope of the invention as set forth in the claims.

What is claimed is:

1. In a multicast communication device receiving a multicast data packet from a multicast delivery server via a multicast router and forwarding the received data packet to a receiving terminal that is requesting reception of the data packet and that does not support multicast communication, the multicast communication device comprising:
   a unit for storing multicast request information including information required to receive multicast data packets;
   a unit for monitoring requests from the receiving terminal to receive multicast information sent by the multicast delivery server and for obtaining the contents of the requests when the requests are detected;
   a unit for storing multicast delivery server information relating to the multicast delivery server, the multicast delivery server information including an address of the multicast delivery server and addresses of receiving terminals subscribing to multicast groups associated with the multicast delivery server;
   a unit for comparing contents of a request obtained by monitoring requests from the receiving terminal with the multicast request information stored in the unit for storing multicast request information to determine if the request obtained by monitoring requests from the receiving terminal comprises a request to receive multicast information sent by the multicast delivery server;
   a unit for generating and sending a join group request to the multicast router including instructing the multicast router to route multicast data packets based on results of the comparison performed when the request is detected, wherein the join group request is not generated if at least one receiving terminal is already subscribed to receive multicast information sent by the multicast delivery server; and
   a unit for receiving data packets multicast from the multicast delivery server corresponding to the join group request, setting a destination address of the data packet to address information of the receiving terminal, and sending the received data packet to the receiving terminal.

2. A multicast communication device as in claim 1 wherein the multicast delivery server information includes at least one of address information of the multicast delivery server, destination address information in a data packet sent by the multicast delivery server, and information for OSI reference model layer 4 through layer 7.

3. A multicast communication device as in claim 1 wherein the joint group request comprises a packet based on a group management protocol.

4. A multicast communication device as in claim 1 further comprising a unit for receiving the multicast delivery server information sent from the multicast delivery server.

5. A multicast communication device as in claim 1 further comprising a unit used by a network administrator to enter the multicast delivery server information.

6. A first multicast router forwarding a multicast data packet comprising:
   a unit for storing multicast request information including information required to receive multicast data packets;
   a unit for monitoring requests from a receiving terminal to receive multicast information sent by a multicast delivery server and obtaining the contents of a request when the request is detected, wherein the receiving terminal does not support multicast communication;
   a unit for generating and sending a join group request to a second multicast router interposed between the multicast delivery server and the first multicast router including instructing the second multicast router to route multicast data packets based on the monitoring results, wherein the join group request is not generated if at least one receiving terminal is already subscribed to receive multicast information sent by the multicast delivery server; and a unit for receiving, via the second multicast router, data packets multicast from the multicast delivery server corresponding to the group join request, setting a destination address of the data packet to address information of the receiving terminal based on the monitoring results, and sending the received data packet to the receiving terminal.

7. A router as in claim 6 wherein the unit for generating and sending join group requests generates the join group request according to a multicast routing protocol.

8. A service system providing information using multicast communication comprising:

a multicast delivery server multicasting data packets containing information to be provided; and a multicast communication device transferring multicast data packets to a receiving terminal that does not support multicast communication, which device includes:

a unit for storing multicast request information including information required to receive multicast data packets;

a unit for monitoring requests from the receiving terminal to receive multicast information sent by the multicast delivery server and obtaining contents of a request if the request is detected;

a unit for storing received multicast delivery server information sent by the multicast delivery server, the multicast delivery server information including an address of the multicast delivery server and addresses of receiving terminals subscribing to multicast groups associated with the multicast delivery server;

a unit for comparing contents of the request obtained by the unit for monitoring with the multicast request information stored in the unit for storing multicast request information;

a unit for generating and sending a join group request to a multicast router interposed between the multicast delivery server and the multicast communication device including instructing the multicast router to route multicast data packets based on results of the comparison performed by the unit for comparing contents of the request when the request is detected, wherein the join group request is not generated if at least one receiving terminal is already subscribed to receive multicast information sent by the multicast delivery server; and a unit for receiving data packets multicast from the multicast delivery server and forwarding the data packets to the receiving terminal.

9. A service system providing information using multicast communication comprising:

a multicast communication device including:

a unit for storing multicast request information including information required to receive multicast data packets;

a unit for monitoring requests from a receiving terminal that does not support multicast communication to receive multicast information sent by a multicast delivery server and for obtaining contents of the requests when the requests are detected; and a unit for sending multicast delivery requests based on the communication monitoring results, wherein the multicast communication device compares each multicast delivery request to multicast service management information, the multicast service management information including service availability information associated with multicast delivery services, and wherein a multicast delivery request is not sent in response to a request from the receiving terminal if the request from the receiving terminal is received outside of service availability indicated by the service availability information of the multicast delivery server; and a data forwarding device receiving data packets multicast from the multicast delivery server and sending the data packets to the receiving terminal.

10. A service system as in claim 9 wherein the multicast communication device includes a unit generating forwarding information for forwarding the data packet to the receiving terminal based on the receiving terminal information and information regarding the data packets to be received by the receiving terminal, and a unit sending the generated association information to the data forwarding device.

11. A service system as in claim 9 wherein:

the data forwarding device includes a unit for receiving the association information and a unit for storing the received association information; and the unit sending the data packet to the receiving terminal sends the data packet to the receiving terminal based on the stored association information.

12. A method in a multicast communication device for providing a receiving terminal that does not support multicast communication with information sent via multicast communication by a multicast delivery server comprising the steps of:

storing multicast request information including information required to receive multicast data packets;

monitoring requests from the receiving terminal to receive multicast information sent by the multicast deliver server;

obtaining the contents of the request when the request is detected;

comparing the contents of the request from the receiving terminal with multicast delivery server information sent by the multicast deliver server and stored on the multicast communication device, the multicast delivery server information including an address of the multicast delivery server and addresses of receiving terminals subscribing to multicast groups associated with the multicast delivery server;

generating and sending a join group request to a multicast router including instructing the multicast router interposed between the multicast delivery server corresponding to the join group request and the multicast communication device to route multicast information based on the monitoring results, wherein the join group request is not generated if at least one receiving terminal is already subscribed to receive multicast information sent by the multicast delivery server;

receiving information multicast from the multicast delivery server; and sending the received information to the receiving terminal.

* * * * *